US011726175B2

(12) United States Patent
DeMarco et al.

(10) Patent No.: US 11,726,175 B2
(45) Date of Patent: Aug. 15, 2023

(54) REAL-TIME CLOSED-LOOP DIGITAL RADAR SIMULATOR

(71) Applicant: Raytheon Company, Waltham, MA (US)

(72) Inventors: Joseph T. DeMarco, Tucson, AZ (US); Brendan W. Jacobs, Tucson, AZ (US); Tyler S. Lacy, Marana, AZ (US); Garrick D. Gaines, Sahuarita, AZ (US); Edward J. Romic, Tucson, AZ (US); Richard E. Jones, Vail, AZ (US); Avery R. Davis, Tucson, AZ (US); Anthony J. Bristow, Vail, AZ (US); Thomas B. Butler, Tucson, AZ (US); Dusty L. Clark, Marana, AZ (US); Scott S. Thoesen, Mesa, AZ (US)

(73) Assignee: Raytheon Company, Waltham, MA (US)

( * ) Notice: Subject to any disclaimer, the term of this patent is extended or adjusted under 35 U.S.C. 154(b) by 254 days.

(21) Appl. No.: 17/033,257

(22) Filed: Sep. 25, 2020

(65) Prior Publication Data
US 2022/0099798 A1    Mar. 31, 2022

(51) Int. Cl.
*G01S 7/40*     (2006.01)

(52) U.S. Cl.
CPC ........... *G01S 7/4052* (2013.01); *G01S 7/4082* (2021.05)

(58) Field of Classification Search
CPC .............................. G01S 7/4052; G01S 7/4082
USPC ........................................................ 342/169
See application file for complete search history.

(56) References Cited

U.S. PATENT DOCUMENTS

| 6,075,480 A * | 6/2000 | Deliberis, Jr. ........ | G01S 7/4052 342/194 |
| 6,346,909 B1 * | 2/2002 | Johnson, Jr. .......... | G01S 7/4052 342/170 |
| 7,327,308 B2 * | 2/2008 | Cheng ................... | G01S 7/4056 342/178 |

(Continued)

FOREIGN PATENT DOCUMENTS

| CN | 109683147 B | * | 9/2020 | ........... G01S 7/4052 |
| CN | 114624658 A | * | 6/2022 | |

OTHER PUBLICATIONS

D. Kenney, D. Stroter and J. Wienke, "Transparent scene stimulation of coherent embedded radar systems," 2014 International Radar Conference, 2014, pp. 1-5, doi: 10.1109/RADAR.2014.7060323. (Year: 2014).*

(Continued)

*Primary Examiner* — Vladimir Magloire
*Assistant Examiner* — Alexander L. Syrkin (57) ABSTRACT

A method includes receiving radar parameters from a unit under test (UUT). The method also includes generating a simulated radar return for the UUT using at least one graphics processing unit (GPU), where the simulated radar return includes digital signals. The method further includes controlling a timing of output of the simulated radar return to the UUT using at least one field programmable gate array (FPGA) carrier. The method also includes converting the digital signals into analog signals using multiple digital-to-analog converters (DACs). In addition, the method includes transmitting the analog signals to the UUT.

20 Claims, 4 Drawing Sheets

(56) References Cited

U.S. PATENT DOCUMENTS 10,852,394 B2 * 12/2020 Salvesen .................. G01S 7/285
2006/0267832 A1 * 11/2006 Newberg .............. G01S 7/4052
　　　　　　　　　　　　　　　　　　　　　　　342/195

OTHER PUBLICATIONS

International Search Report and Written Opinion of the International Searching Authority dated Nov. 25, 2021 in connection with International Patent Application No. PCT/US2021/016444, 11 pages.
Kenney et al., "Transparent Scene Stimulation of Coherent Embedded Radar Systems," 2014 International Radar Conference, IEEE, Oct. 2014, 5 pages.
Badarinath et al., "GP-GPU based high-performance test equipment for debugging radar digital units," 2016 International Conference on Data Mining and Advanced Computing, IEEE, Mar. 2016, 5 pages.

* cited by examiner

REAL-TIME CLOSED-LOOP DIGITAL RADAR SIMULATOR

TECHNICAL FIELD

This disclosure is directed in general to radar systems. More specifically, this disclosure is directed to a real-time closed-loop digital radar simulator.

BACKGROUND

Modern radar systems routinely need to be tested and calibrated under controlled conditions. One type of radar test system, known as a radar return simulator or a target generator, generates simulated return signals that a radar might receive in the field and applies the simulated signals to the radar in order to test the radar's performance. Conventional radar return simulators are typically very hardware intensive. In order to simulate a single radar return, a conventional radar return simulator requires radio frequency (RF) hardware to generate or receive a radar transmit waveform, mix the transmit signal with an appropriate Doppler frequency, and add an appropriate delay. When simulating multiple radar return, each return is typically generated separately, so each added return needs additional RF hardware. As a result, a conventional radar return simulator can become very large and expensive when multiple returns need to be simulated.

SUMMARY

This disclosure provides a real-time closed-loop digital radar simulator.

In a first embodiment, a method includes receiving radar parameters from a unit under test (UUT). The method also includes generating a simulated radar return for the UUT using at least one graphics processing unit (GPU), where the simulated radar return includes digital signals. The method further includes controlling a timing of output of the simulated radar return to the UUT using at least one field programmable gate array (FPGA) carrier. The method also includes converting the digital signals into analog signals using multiple digital-to-analog converters (DACs). In addition, the method includes transmitting the analog signals to the UUT.

In a second embodiment, an apparatus includes at least one GPU configured to receive radar parameters from a UUT and generate a simulated radar return for the UUT, where the simulated radar return includes digital signals. The apparatus also includes at least one FPGA carrier configured to control a timing of output of the simulated radar return to the UUT. The apparatus further includes multiple DACs configured to convert the digital signals into analog signals and transmit the analog signals to the UUT.

In a third embodiment, a system includes a UUT, where the UUT includes at least a portion of a radar system. The system also includes at least one GPU configured to receive radar parameters from the UUT and generate a simulated radar return for the UUT, where the simulated radar return includes digital signals. The system further includes at least one FPGA carrier configured to control a timing of output of the simulated radar return to the UUT. In addition, the system includes multiple DACs configured to convert the digital signals into analog signals and transmit the analog signals to the UUT.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 5, described below, and the various embodiments used to describe the principles of the present disclosure in this patent document are by way of illustration only and should not be construed in any way to limit the scope of the disclosure. Those skilled in the art will understand that the principles of the present disclosure may be implemented in any type of suitably arranged device or system.

For simplicity and clarity, some features and components are not explicitly shown in every figure, including those illustrated in connection with other figures. It will be understood that all features illustrated in the figures may be employed in any of the embodiments described. Omission of a feature or component from a particular figure is for purposes of simplicity and clarity, and is not meant to imply that the feature or component cannot be employed in the embodiments described in connection with that figure. It will be understood that embodiments of this disclosure may include any one, more than one, or all of the features described here. Also, embodiments of this disclosure may additionally or alternatively include other features not listed here.

As noted above, modern radar systems routinely need to be tested and calibrated under controlled conditions, and one type of radar test system is known as a radar return simulator. Often times, a conventional radar return simulator receives an analog signal from a unit under test (UUT), which typically includes at least part of a radar, and manipulates the signal in the analog domain in order to present a simulated representation of a scene back to the UUT. For example, the manipulated signal can be fed back to a receiver of the UUT in order to simulate the received signals. Many conventional radar return simulators, such as computer in the loop (CIL) radar simulators, use specialized analog equipment to synthesize radar scatter returns. Unfortunately, the expense and complexity of designing, building, calibrating, and maintaining the specialized analog equipment is often prohibitive. The equipment and cost per scatterer is very linear, which limits the number of scatterers that can be practically generated (often to no more than approximately ten scatterers). In addition, many of these systems do not feature enough fidelity to accurately test modern radar systems. Previous attempts at replacing analog electronics with real-time digital-based simulations have been hampered by processing time and data throughput latencies or still rely on analog methods to control characteristics like delays, phases, and Doppler frequencies.

This disclosure provides various techniques for supporting real-time closed-loop digital radar simulations. As described in more detail below, the disclosed embodiments are capable of digitally synthesizing radar returns for radar simulations without the need for complicated or numerous analog components. Using the disclosed embodiments, the cost, size, and complexity of closed-loop radar system testing can be reduced substantially, while performance can be greatly improved (such as by a factor of one hundred or more) at the same time. Note that while the disclosed embodiments may be described below in conjunction with a radar system used in defense-related applications, other applications are within the scope of this disclosure.

Figure 1:
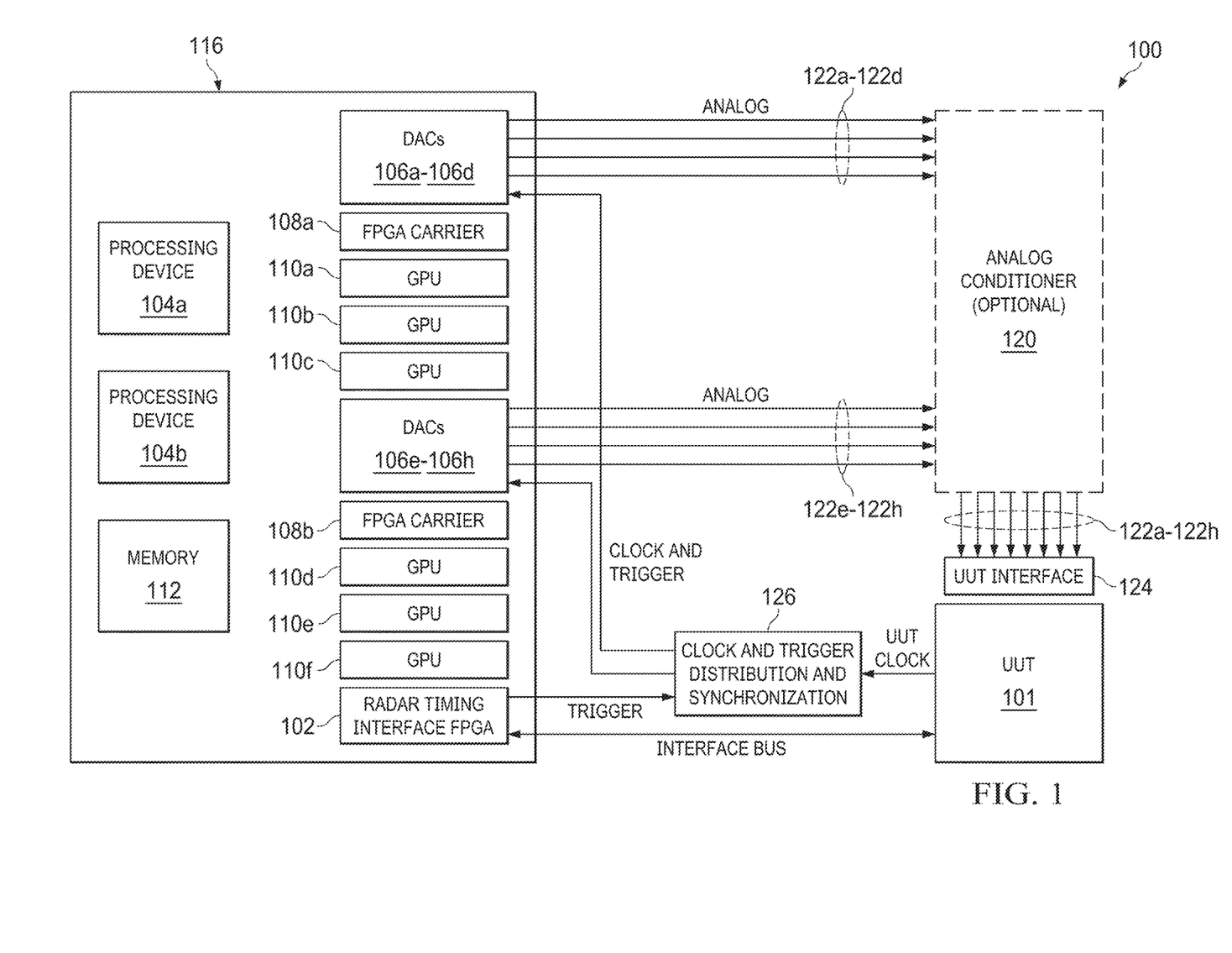
FIG. 1 illustrates an example system for performing a real-time closed-loop digital radar simulation according to this disclosure

FIG. 1 illustrates an example system 100 for performing a real-time closed-loop digital radar simulation according to this disclosure. As shown in FIG. 1, the system 100 includes a unit under test (UUT) 101, a radar timing interface field programmable gate array (FPGA) 102, multiple processing devices 104a-104b, multiple digital-to-analog converters (DACs) 106a-106h, multiple FPGA carriers 108a-108b, and multiple graphics processing units (GPUs) 110a-110f.

The system 100 generally operates here to calculate radar returns in a timeframe that is short enough so that a digitally-synthesized closed-loop simulation can be performed in real-time. The number of generated radar returns that may be produced by the system 100 in FIG. 1 may be limited only by the number and performance of the GPUs 110a-110f and how much time is given by the system requirements. Thus, the system 100 is scalable for testing of simple to highly-complex radar scenes. The calculations and functions performed within the system 100 are distributed across the components of the system 100 according to the capabilities of each component so as to optimize the performance of the system 100 as a whole. For example, as discussed in greater detail below, the processing devices 104a-104b can be used to perform non-timing critical calculations, the GPUs 110a-110f can be used to perform timing and precision critical math, and the FPGA carriers 108a-108b can be used to perform calculations and functions best suited to streaming data.

The UUT 101 represents a radar system or a device that includes a radar system (such as a missile system) that is undergoing testing using the system 100. In some embodiments, the UUT 101 may represent a ground-based radar system that is installed in a fixed position on land or on a ground vehicle. In other embodiments, the UUT 101 may represent a radar system disposed in or on an aircraft, spacecraft, or other flight vehicle (such as a missile or drone). In the specific example shown in FIG. 1, the UUT 101 represents an eight-channel radar system, although this is merely for illustration only. Other numbers of channels are possible (such as a six-channel radar system) and within the scope of this disclosure.

The radar timing interface FPGA 102 is configured to be coupled to the UUT 101, such as via one or more cables or other suitable physical or wireless interface. The radar timing interface FPGA 102 generally operates to collect radar parameters from the UUT 101, such as radar waveform information and timing information. The radar parameters are used by the system 100 to understand the type and timing of radar signals that are to be tested, which allows the system 100 to then generate suitable radar return information. After receiving the radar parameters from the UUT 101, the radar timing interface FPGA 102 provides the radar parameters to the processing devices 104a-104b and also generates a trigger enabling the system 100 to provide radar returns to the UUT 101 with precise timing.

Each processing device 104a-104b generally operates to receive the radar parameters from the UUT 101 and process the radar parameters. Based on the radar parameters, the processing devices 104a-104b generate tasks associated with the creation of the radar parameters. Once the tasks are generated, the processing devices 104a-104b send the tasks and the radar parameters to the GPUs 110a-110f for processing. Each processing device 104a-104b represents any suitable structure configured to receive and process radar parameters and generate tasks. Example types of processing devices 104a-104b include microprocessors, microcontrollers, digital signal processors (DSPs), application specific integrated circuits (ASICs), or discrete circuitry. In some embodiments, the processing devices 104a-104b represent commercial-off-the-shelf (COTS) central processing units (CPUs), such as CPUs from INTEL or other manufacturer.

In some embodiments, the processing devices 104a-104b can operate according to instructions stored in a memory 112. The memory 112 can also store data associated with radar parameters and radar return information. The memory 112 represents any structure(s) capable of storing and facilitating retrieval of information (such as data, program code, and/or other suitable information on a temporary or permanent basis). The memory 112 may represent a random access memory or any other suitable volatile or non-volatile storage device(s). While the system 100 is depicted with two processing devices 104a-104b and one memory 112 in FIG. 1, this is merely one example implementation. Other embodiments may include other numbers of processing devices and/or other numbers of memories.

Based on the tasks received from the processing devices 104a-104b, the GPUs 110a-110f use the radar parameters and a three-dimensional, six degrees of freedom (6DoF) physics model of a scene in order to simulate one or more radar returns for the UUT 101. In some embodiments, the physics model can include UUT 101 kinematic movements and responses to physics model stimuli. Each GPU 110a-110f generally operates to generate digitally-synthesized signals associated with the simulated radar return, including suitable Doppler frequencies, phases, and signal delays. The simulated radar return shows what the UUT 101 might "see" based on the radar parameters collected by the radar timing interface FPGA 102. The simulated radar return can include simple or highly-complex scenes, including one or more extended targets, clutter, one or more electronic attack (EA) effects, and the like.

In this particular example, the system 100 includes six GPUs 110a-110f arranged in groups that operate in parallel and that are associated with different FPGA carriers 108a-108b. In this example, the GPUs 110a-110c are associated with the FPGA carrier 108a, and the GPUs 110d-110f are associated with the FPGA carrier 108b. Each FPGA carrier 108a-108b corresponds to a different set of radar channels 122a-122h of the UUT 101, and the GPUs 110a-110c or 110d-110f corresponding to each FPGA carrier 108a or 108b operate in parallel in order to generate the simulated radar return information associated with one set of radar channels 122a-122d or 122e-122h. The radar return information includes coherent radar waveform information across the radar channels 122a-122h. In some embodiments, the GPUs 110a-110f have suitable processing power to generate the radar return information in less than one millisecond for real-time operation.

Each GPU 110a-110f represents any suitable structure configured to generate simulated radar return information. In some embodiments, the GPUs 110a-110f are COTS GPU cards. Also, in some embodiments, the GPUs 110a-110f can operate according to instructions stored in the memory 112. Also, in other embodiments, the GPUs 110a-110f can be substituted with FPGAs or ASICs. While the system 100 is depicted with six GPUs 110a-110f, this is merely one example implementation. Other embodiments may include other numbers of GPUs. In general, more GPUs allow for greater radar scene complexity or less computation time.

The FPGA carriers 108a-108b receive the simulated radar return information from the GPUs 110a-110f. Using a clock/trigger signal from a clock synchronizer 126, the FPGA carriers 108a-108b operate to control the timing of when the radar return information is output to the UUT 101. Each FPGA carrier 108a or 108b operates as a carrier for a corresponding group of DACs 106a-106d or 106e-106h. In the embodiment shown in FIG. 1, each FPGA carrier 108a-108b supports four DACs 106a-106h. While the system 100 is depicted with two FPGA carriers 108a-108b each supporting four DACs 106a-106h, this is merely one example implementation. Other embodiments may include other numbers of FPGA carriers, which support other numbers of DACs.

Using the timing control from the FPGA carriers 108a-108b, the DACs 106a-106h operate to convert the digitally-synthesized signals associated with the simulated radar return to analog signals that the UUT 101 can actually receive and process. Each DAC 106a-106h is associated with a corresponding channel of the UUT 101. That is, each DAC 106a-106h generates an analog signal to be transmitted over one of the radar channels 122a-122h. Each DAC 106a-106h represents any suitable structure configured to convert digital signals into analog signals. In some embodiments, each DAC 106a-106h includes a giga-sample DAC, although other suitable DACs are possible and within the scope of this disclosure.

In some embodiments, the DACs 106a-106h generate the analog signals at an intermediate frequency (IF) for injection into a UUT interface 124 of the UUT 101. As known in the art, IF is often utilized in radar systems when going from digital-to-analog in accordance with the superheterodyne principle. In the system 100, instead of the DACs 106a-106h converting digital signals into analog signals at a radio frequency (RF)—only to have a receiver at the UUT 101 convert the analog signals back to intermediate frequency—the DACs 106a-106h can generate each analog signal at the IF. If necessary, any RF up-conversion, down-conversion, and propagation steps can be simulated by the GPUs 110a-110f. Of course, generating analog signals at IF is merely one example implementation. In general, the system 100 is frequency-independent and can simulate radar return signals or other types of signals at any suitable frequency or frequencies.

Also, in some embodiments, the system 100 may include at least one optional analog conditioner 120. The analog conditioner 120 receives analog signals carried over the radar channels 122a-122h and conditions each analog signal (such as by attenuation or amplification) to better accommodate the specifications of the UUT 101. For example, in some tests, the UUT 101 can exhibit limited dynamic range. In such cases, if the analog signals from the DACs 106a-106h are too strong, the analog conditioner 120 can attenuate the signals. The analog conditioner 120 can also be used to attenuate or amplify the simulated radar returns so that they represent the power levels encountered in a real radar environment.

The UUT interface 124 receives the analog signals generated by the DACs 106a-106h and carried over the radar channels 122a-122h. Once the analog signals are received by the UUT interface 124, the UUT 101 can process the analog signals, interpret the simulated radar return information contained in the signals, and make any operational adjustments as needed. Operational changes by the UUT 101 may then be fed back to the radar timing interface FPGA 102 in a real-time closed-loop manner. In some embodiments, the UUT interface 124 is the same interface that a radar antenna would connect to when the UUT 101 operates in a real-world environment (not during testing). Also, in some embodiments, the UUT interface 124 can include one or more RF cables.

The clock synchronizer 126 operates to ensure that the UUT 101, the DACs 106a-106h, and the analog conditioner 120 have synchronized clocks or use the same clock source. This enables the DACs 106a-106h to output the analog signals to the UUT 101 at precisely the right time. In one aspect of operation, the clock synchronizer 126 can receive timing information from the UUT 101, process the timing information to generate a clock or trigger signal, and provide the clock or trigger signal to the DACs 106a-106h and the analog conditioner 120. In some embodiments, the system 100 can perform timing and synchronization of the signals via a waveform timing alignment technique. One example of this type of technique is described in U.S. patent application Ser. No. 17/033,329, which is hereby incorporated by reference in its entirety. Using this technique, the system 100 can achieve waveform time control and alignment of less than or equal to the DAC's sampling period divided by two. The system 100 can achieve phase control and alignment at the accuracy of the DAC's phase control word for the analog signals transmitted across the radar channels 122a-122h.

For convenience, the radar timing interface FPGA 102, processing devices 104a-104b, DACs 106a-106h, FPGA carriers 108a-108b, GPUs 110a-110f, and memory 112 can be disposed together in one housing 116. In some embodiments, the housing 116 includes a small COTS rack or chassis. This is in contrast to some conventional analog systems, which can include enough components to occupy four or more full size (six-foot) racks. Note, however, that the radar timing interface FPGA 102, processing devices 104a-104b, DACs 106a-106h, FPGA carriers 108a-108b, GPUs 110a-110f, and memory 112 can be housed in any other suitable manner.

Using the components shown in FIG. 1, the system 100 enables full testing coverage of tactical hardware, firmware, and software of the UUT 101. The system 100 provides much greater testing flexibility over conventional analog systems. Radar and kinematic scenarios can be easily updated in the system 100 via simple software or data updates. For example, the system 100 can be readily updated to add, change, or remove radar return signals associated with one or more scatterers, weather objects, clutter, EA effects, and the like (no hardware changes may be needed). Calibration of the system 100 is simplified and can be performed in minutes. In contrast, in a conventional analog system, a new scene might require new racks of hardware to simulate and require weeks to calibrate.

The system 100 is fully scalable both in the frequencies used and in the number of radar channels supported. Components (such as processing devices 104a-104b, DACs 106a-106h, FPGA carriers 108a-108b, GPUs 110a-110f, analog conditioners 120, radar channels 122a-122h, and the like) can be added, combined, or removed to scale the system 100 as needed. In some embodiments, the system 100 can support direct digital injection into the UUT 101. That is, some embodiments of the system 100 can operate without any DACs 106a-106h and maintain the radar return signals in an all-digital format. Such digital signals can be injected directly into the signal processing system of the UUT 101. In some embodiments, the system 100 can support RF projection, where each DAC channel drives an antenna on an array wall within an anechoic chamber. The DAC channels can be optionally conditioned with frequency up/down conversion, signal gain, or attenuation to meet the requirements of the RF projection embodiments.

Although FIG. 1 illustrates one example of a system 100 for performing a real-time closed-loop digital radar simulation, various changes may be made to FIG. 1. For example, the system 100 may include any suitable numbers of processing devices, DACs, FPGA carriers, and GPUs. In general, the makeup and arrangement of the system 100 are for illustration only. Components may be added, omitted, combined, rearranged, or placed in any other configuration according to particular needs.

Figure 2:
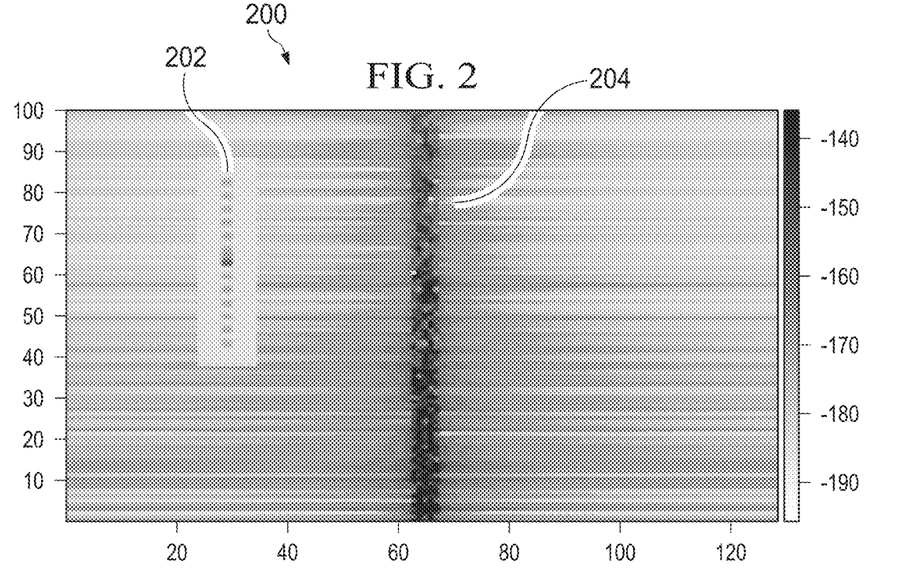
FIGS. 2, 3, and 4 illustrate examples of benefits that can be realized using a real-time closed-loop digital radar simulation according to this disclosure.
Figure 3:
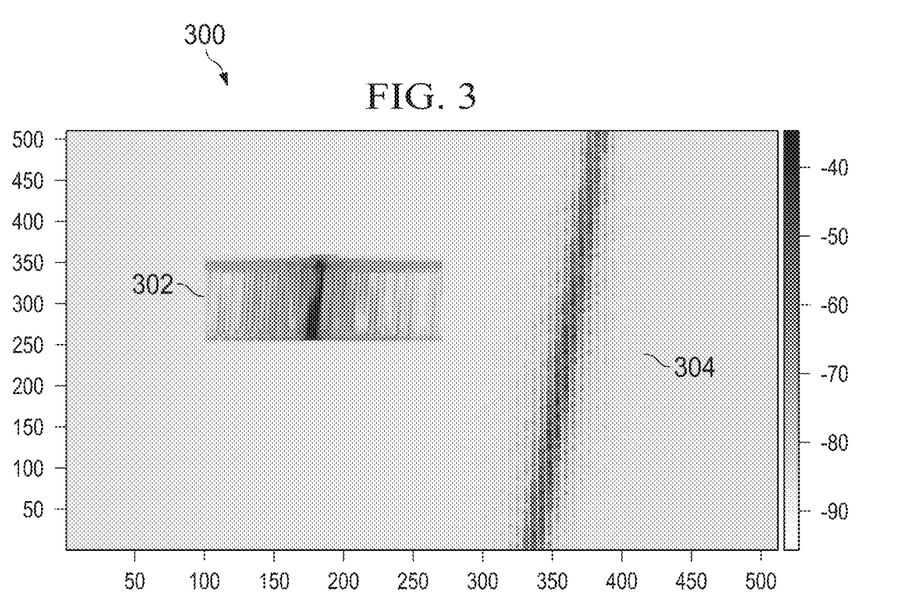
Figure 4:
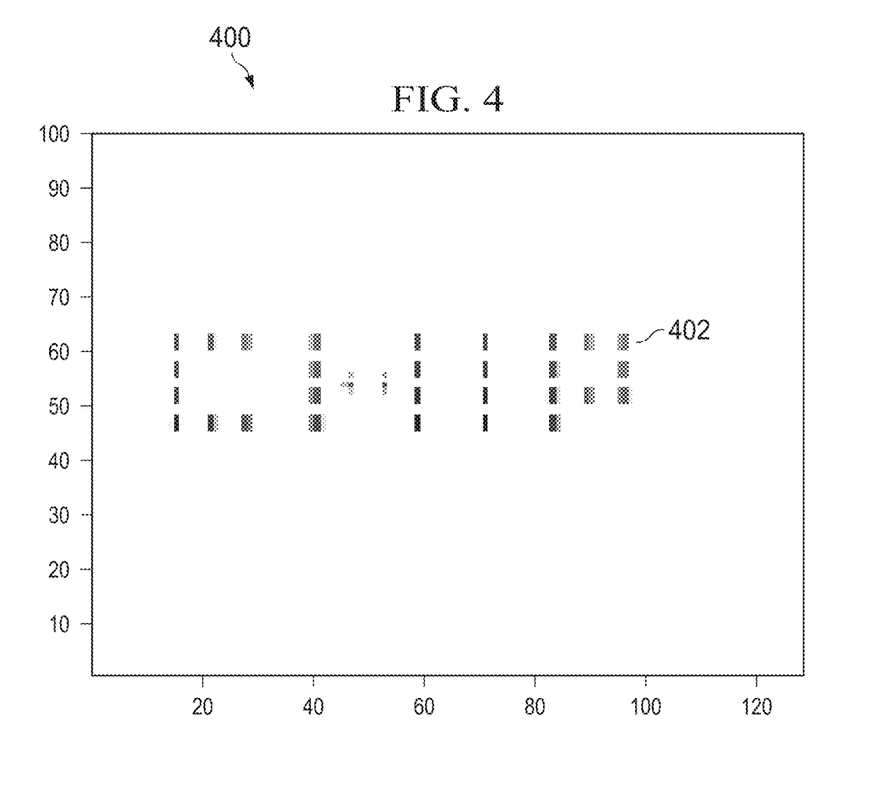

FIGS. 2, 3, and 4 illustrate examples of benefits that can be realized using real-time closed-loop digital radar simulation according to this disclosure. In particular, FIGS. 2 and 3 depict a comparison between an image 200 of a radar scene generated using a conventional radar simulation technique and an image 300 of the same radar scene generated using the system 100 of FIG. 1. The images 200, 300 generally represent what a radar system might "see" during actual operation.

As shown in FIG. 2, the image 200 was generated using a conventional radar simulation technique. The image 200 includes a target object 202 that represents a target and a background object 304 that may represent clutter, an interference signal, or the like. In contrast, the image 300 in FIG. 3 was generated using the system 100 as described above. The image 300 also includes a target object 302 representing the target and a background object 304 representing clutter, an interference signal, or the like.

As shown in the image 200, the target object 202 is represented as a single point scatterer with an ideal signature in the range and Doppler dimensions. However, in the image 300, the target object 302 is represented by hundreds of point scatterers, resulting in a more realistic radar signature in the range and Doppler dimensions. Similarly, in the image 200, the background object 204 is generated with a noise source with a fixed position and orientation in range and Doppler. However, in the image 300, the background object 304 is represented by a collection of scatterers in 3D space and therefore exhibits a realistic orientation in range and Doppler that changes with scene geometry. The image 300 is a much more accurate representation of what a radar system under test would actually receive or generate.

In FIG. 4, the image 400 shows a clear example of the precise control of individual reflection points available using the system 100. As shown in FIG. 4, the word "CHIP" is spelled with thirty-one reflection points 402 in the range and Doppler dimensions. Using conventional radar return generators, it would be nearly impossible to scale the necessary physical analog hardware in size to generate thirty-one individual targets. In contrast, the system 100 is easily capable of generating thirty-one reflection points 402, since the targets are generated digitally. As discussed above, the system 100 can provide a representation of many more scattering centers or reflection points, as well as much higher fidelity of the position of each scattering center. In some embodiments, the system 100 improves fidelity by fifty to one hundred times or more.

Although FIGS. 2 through 4 illustrate examples of benefits that can be realized using real-time closed-loop digital radar simulation, various changes may be made to FIGS. 2 through 4. For example, FIGS. 2 through 4 are merely meant to illustrate some examples of the type of benefits that may be obtained using real-time closed-loop digital radar simulation. Images of radar scenes vary widely, and other results may be obtained depending on the radar scene and the implementation.

Figure 5:
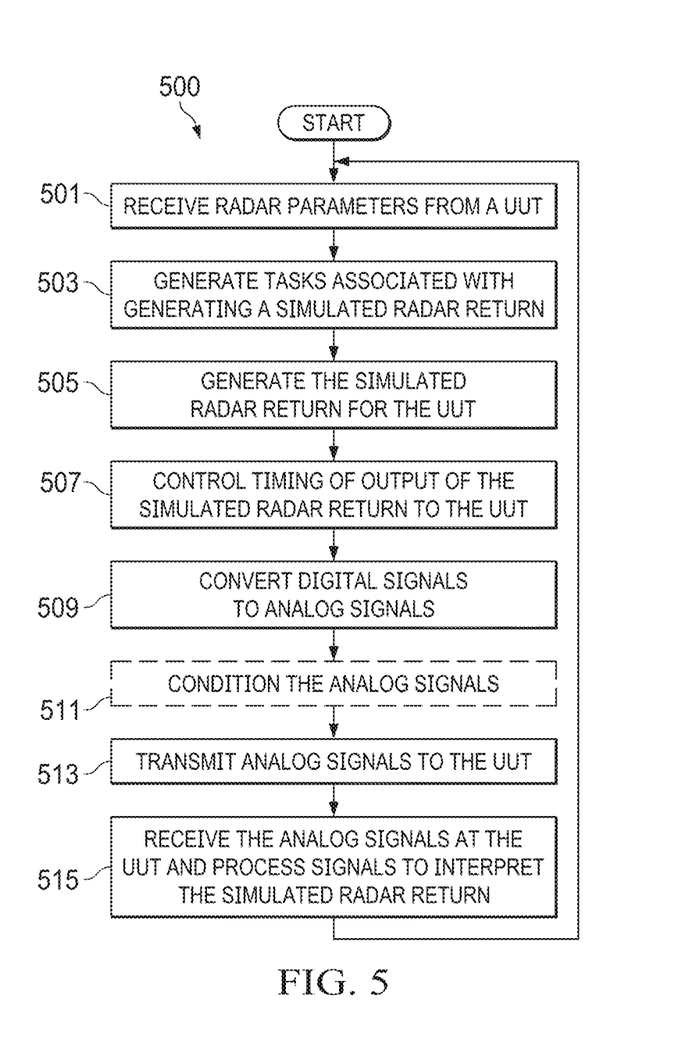
FIG. 5 illustrates an example method for performing a real-time closed-loop digital radar simulation according to this disclosure.

FIG. 5 illustrates an example method 500 for performing a real-time closed-loop digital radar simulation according to this disclosure. For ease of explanation, the method 500 is described as being performed using the system 100 of FIG. 1. However, the method 500 may be used with any other suitable device or system.

As shown in FIG. 5, radar parameters are received from a UUT at step 501. This may include, for example, the radar timing interface FPGA 102 receiving radar parameters from the UUT 101. Multiple tasks are generated using at least one processing device at step 503. This may include, for example, at least one of the processing devices 104a-104b receiving the radar parameters, generating multiple tasks, and sending the tasks to at least one of the GPUs 110a-110f. The tasks are associated with the generation of a simulated radar return.

A simulated radar return for the UUT is generated using at least GPU at step 505. This may include, for example, at least one of the GPUs 110a-110f generating a simulated radar return for the UUT 101. The simulated radar return includes digital signals. In some embodiments, the simulated radar return can include return signals associated with one or more scatterers, one or more weather objects, clutter, one or more EA effects, or a combination of these. For pulsed radar embodiments, a scene of one or more simulated radar returns can be calculated for each pulse's receive window, accurately simulating pulse to pulse scene kinematic changes during a coherent processing interval. A timing of the output of the simulated radar return to the UUT is controlled using at least one FPGA carrier at step 507. This may include, for example, at least one of the FPGA carriers 108a-108b controlling the timing of the output of the simulated radar return to the UUT 101.

The digital signals are converted into analog signals using multiple DACs at step 509. This may include, for example, at least some of the DACs 106a-106h receiving the digital signals from the GPUs 110a-110f and converting the digital signals into analog signals. The analog signals are optionally conditioned using at least one analog conditioner at step 511. This may include, for example, the analog conditioner 120 attenuating or amplifying the analog signals. The analog signals can be conditioned according to one or more specifications of the UUT 101 and/or to represent the power levels encountered in a real radar environment.

The analog signals (or their conditioned versions) are transmitted to the UUT at step 513. This may include, for example, at least some of the DACs 106a-106h transmitting the analog signals to the UUT 101 over at least some of the radar channels 122a-122h. In some embodiments, the analog signals are transmitted to the UUT over multiple radar channels 122a-122h, where each channel corresponds to one of the DACs 106a-106h.

The analog signals are received at the UUT at step 515, and the UUT can process the signals to interpret the simulated radar return and make any operational adjustments as needed. This may include, for example, the UUT 101 receiving the analog signals, processing the signals, interpreting the simulated radar return, and making any desired operational adjustments. The adjusted UUT can then generate second radar return information, at which point the method 500 can return to step 501 where the second radar parameters are received from the UUT. This allows operational changes by the UUT 101 to be fed back to the radar timing interface FPGA 102 in a real-time closed-loop manner.

Although FIG. 5 illustrates one example of a method 500 for performing a real-time closed-loop digital radar simulation, various changes may be made to FIG. 5. For example, while shown as a series of steps, various steps shown in FIG. 5 may overlap, occur in parallel, occur in a different order, or occur multiple times. Also, some steps may be combined or removed and additional steps may be added according to particular needs.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive (HDD), a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   receiving radar parameters from a unit under test (UUT);
   generating multiple tasks based on the radar parameters;
   sending the tasks and the radar parameters to multiple graphics processing units (GPUs);
   generating, using the GPUs, a simulated radar return for the UUT based on the tasks, the radar parameters, and a three-dimensional model of a scene, the simulated radar return comprising digital signals;
   controlling a timing of output of the simulated radar return to the UUT using multiple field programmable gate array (FPGA) carriers, the FPGA carriers associated with different ones of the GPUs;
   converting the digital signals into analog signals using multiple digital-to-analog converters (DACs); and
   transmitting the analog signals to the UUT.

2. The method of claim 1, wherein the multiple tasks are generated using at least one processing device, the tasks associated with generating the simulated radar return.

3. The method of claim 1, wherein the radar parameters are received via a directed routing FPGA.

4. The method of claim 1, wherein the analog signals are transmitted to the UUT over multiple radar channels, each radar channel corresponding to one of the DACs.

5. The method of claim 1, further comprising:
   conditioning the analog signals using at least one analog conditioner before transmitting the analog signals to the UUT, the analog signals conditioned according to one or more specifications of the UUT or to represent power levels encountered in a real radar environment.

6. The method of claim 1, wherein the simulated radar return comprises one or more return signals associated with at least one of: one or more scatterers, one or more weather objects, clutter, or one or more electronic attack (EA) effects.

7. The method of claim 1, further comprising:
   receiving second radar parameters from the UUT after the UUT receives and processes the analog signals, wherein the analog signals enable the UUT to interpret the simulated radar return and generate the second radar parameters.

8. An apparatus comprising:
   multiple graphics processing units (GPUs);
   at least one processing device configured to:
      receive radar parameters from a unit under test (UUT);
      generate multiple tasks based on the radar parameters; and
      send the tasks and the radar parameters to the GPUs, wherein the GPUs are configured to generate a simulated radar return for the UUT based on the tasks, the radar parameters, and a three-dimensional model of a scene, the simulated radar return comprising digital signals;

multiple field programmable gate array (FPGA) carriers configured to control a timing of output of the simulated radar return to the UUT, the FPGA carriers associated with different ones of the GPUs; and multiple digital-to-analog converters (DACs) configured to convert the digital signals into analog signals and transmit the analog signals to the UUT.

9. The apparatus of claim 8, wherein the multiple tasks are associated with generation of the simulated radar return.

10. The apparatus of claim 9, further comprising:
a directed routing FPGA configured to be coupled to the UUT and to receive the radar parameters from the UUT.

11. The apparatus of claim 8, wherein the DACs are configured to transmit the analog signals to the UUT over multiple radar channels, each radar channel corresponding to one of the DACs.

12. The apparatus of claim 8, further comprising:
at least one analog conditioner configured to condition the analog signals according to one or more specifications of the UUT before the analog signals are transmitted to the UUT or to represent power levels encountered in a real radar environment.

13. The apparatus of claim 8, wherein the simulated radar return comprises one or more return signals associated with at least one of: one or more scatterers, one or more weather objects, clutter, or one or more electronic attack (EA) effects.

14. The apparatus of claim 8, wherein the multiple GPUs are further configured to receive second radar parameters from the UUT after the UUT receives and processes the analog signals, the second radar parameters based on the analog signals.

15. A system comprising:
a unit under test (UUT), the UUT comprising at least a portion of a radar system;
multiple graphics processing units (GPUs);
at least one processing device configured to:
  receive radar parameters from the UUT;
  generate multiple tasks based on the radar parameters; and
  send the tasks and the radar parameters to the GPUs, wherein the GPUs are configured to generate a simulated radar return for the UUT based on the tasks, the radar parameters, and a three-dimensional model of a scene, the simulated radar return comprising digital signals;
multiple field programmable gate array (FPGA) carriers configured to control a timing of output of the simulated radar return to the UUT, the FPGA carriers associated with different ones of the GPUs; and
multiple digital-to-analog converters (DACs) configured to convert the digital signals into analog signals and transmit the analog signals to the UUT.

16. The system of claim 15, wherein the multiple tasks are associated with generation of the simulated radar return.

17. The system of claim 16, further comprising:
a directed routing FPGA configured to be coupled to the UUT and to receive the radar parameters from the UUT.

18. The system of claim 15, wherein the DACs are configured to transmit the analog signals to the UUT over multiple radar channels, each radar channel corresponding to one of the DACs.

19. The system of claim 15, further comprising:
at least one analog conditioner configured to condition the analog signals according to one or more specifications of the UUT before the analog signals are transmitted to the UUT or to represent power levels encountered in a real radar environment.

20. The system of claim 15, wherein the multiple GPUs are further configured to receive second radar parameters from the UUT after the UUT receives and processes the analog signals, the second radar parameters based on the analog signals.

* * * * *

UNITED STATES PATENT AND TRADEMARK OFFICE
CERTIFICATE OF CORRECTION

PATENT NO. : 11,726,175 B2
APPLICATION NO. : 17/033257
DATED : August 15, 2023
INVENTOR(S) : DeMarco et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 314 days.

Signed and Sealed this
Twelfth Day of November, 2024

Katherine Kelly Vidal
*Director of the United States Patent and Trademark Office*